Jan. 11, 1949.  E. G. BAILEY  2,458,497
COMBUSTION CHAMBER

Filed May 5, 1945  5 Sheets-Sheet 1

INVENTOR
Ervin G. Bailey
BY
M. Holbrook
ATTORNEY

Jan. 11, 1949.     E. G. BAILEY     2,458,497
COMBUSTION CHAMBER

Filed May 5, 1945     5 Sheets-Sheet 2

INVENTOR
*Ervin G. Bailey*
BY
ATTORNEY

Jan. 11, 1949. E. G. BAILEY 2,458,497
COMBUSTION CHAMBER
Filed May 5, 1945 5 Sheets-Sheet 3

INVENTOR
Ervin G. Bailey
BY
R. W. Holbrook
ATTORNEY

INVENTOR
Ervin G. Bailey
BY
M. Holbrook
ATTORNEY

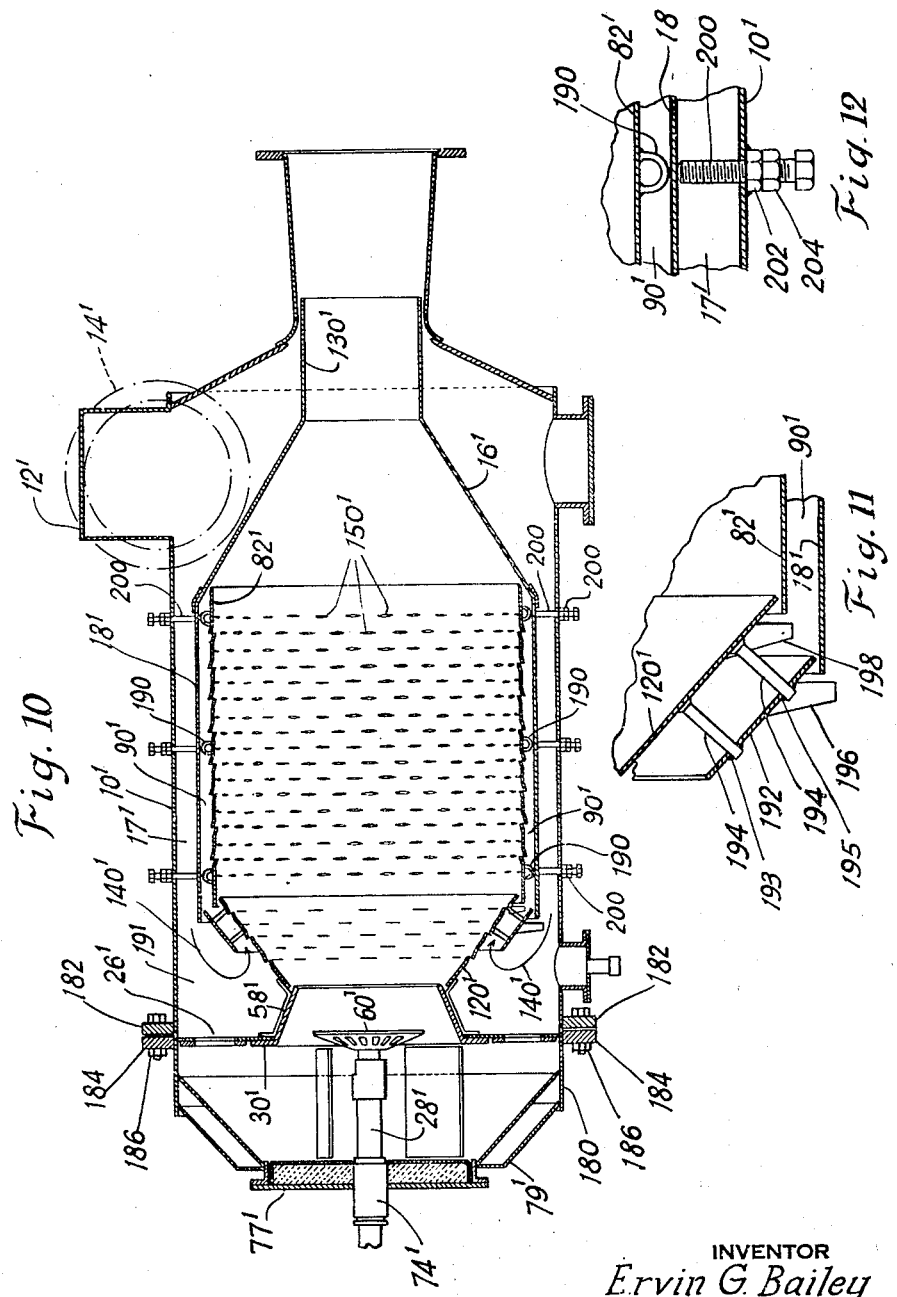

Patented Jan. 11, 1949

2,458,497

UNITED STATES PATENT OFFICE 2,458,497

COMBUSTION CHAMBER

Ervin G. Bailey, Easton, Pa., assignor to The Babcock & Wilcox Company, Rockleigh, N. J., a corporation of New Jersey Application May 5, 1945, Serial No. 592,257

8 Claims. (Cl. 263—19)

This invention relates to combustion chambers and particularly to metallic combustion chambers for the production of heating or power gases of moderate temperatures and at super-atmospheric pressures.

Gases at such temperatures, ranging from 900° F. to 2000° F., are in demand for heating or for power purposes, the latter being exemplified in the case of a gas turbine where gases at super-atmospheric pressure and moderately high temperature are expanded in the production of useful mechanical work. In such uses of moderately heated gases it is important that they be free of entrained solids of a character which might contaminate the product being heated or endanger the structure of the turbine actuated by the gases. Although ceramic materials may be well adapted for the temperature conditions involved they are subject to spalling and abrasion and do not have the strength characteristics making them adapted to the problems involved.

Although water and air cooled metal lined combustion chambers have been suggested for the heating of pressure gases to the pertinent temperatures, they have failed to be wholly satisfactory and have not attained all of the desired characteristics, such as long life, simplicity of construction, light weight of structure, high thermal efficiency, and economical draft loss of the cooling medium, while operable at high rates of heat liberation with high combustion efficiency.

An object of the invention is to provide a combustion chamber having a novel wall construction which is self-cooling by a minimum flow of admixed air in excess of combustion requirements. An additional object of the invention is the provision of such a combustion chamber wall with an associated air jacket which will require a minimum thickness and weight of heat insulating covering to attain a low radiation loss to the external atmosphere.

A still further object of the invention is the provision of an air jacketed metal wall combustion chamber which will function with a minimum air pressure drop and which is adaptable to confine air at appreciable super-atmospheric pressure during the direct heating of the air.

Another object of the invention is the introduction of air for fuel combustion axially of the chamber, while introducing a secondary flow of air in small closely adjacent streams in directions generally axially of the chamber throughout the major length of the combustion chamber. Another object of the invention is an arrangement of a metallic air jacket about the inner metallic combustion chamber wall which will intercept heat outwardly radiated from the wall and transmit it to the incoming air stream.

A particular advantage of the method of construction of the invention is the ability to keep the metallic combustion chamber wall as one integral cylindrical piece and to maintain the air apertures therethrough so spaced as to proximity and arrangement of spacing that they provide adequate cooling air for the inner face of the wall by causing it to travel parallel to the inner wall surface, and this is accomplished in such a manner that temperature changes in the wall structure or improper assembly will not modify the size of the aperture or affect the uniform distribution of air through them.

The invention will be described with reference to the accompanying drawings, and, other objects of the invention will appear as the description proceeds.

In the drawings:

Fig. 10 is a section, similar to Fig. 2, of a modified combustion chamber; and

Figs. 11 and 12 are enlarged fragmentary views of details of the Fig. 10 embodiment.

Figure 1:
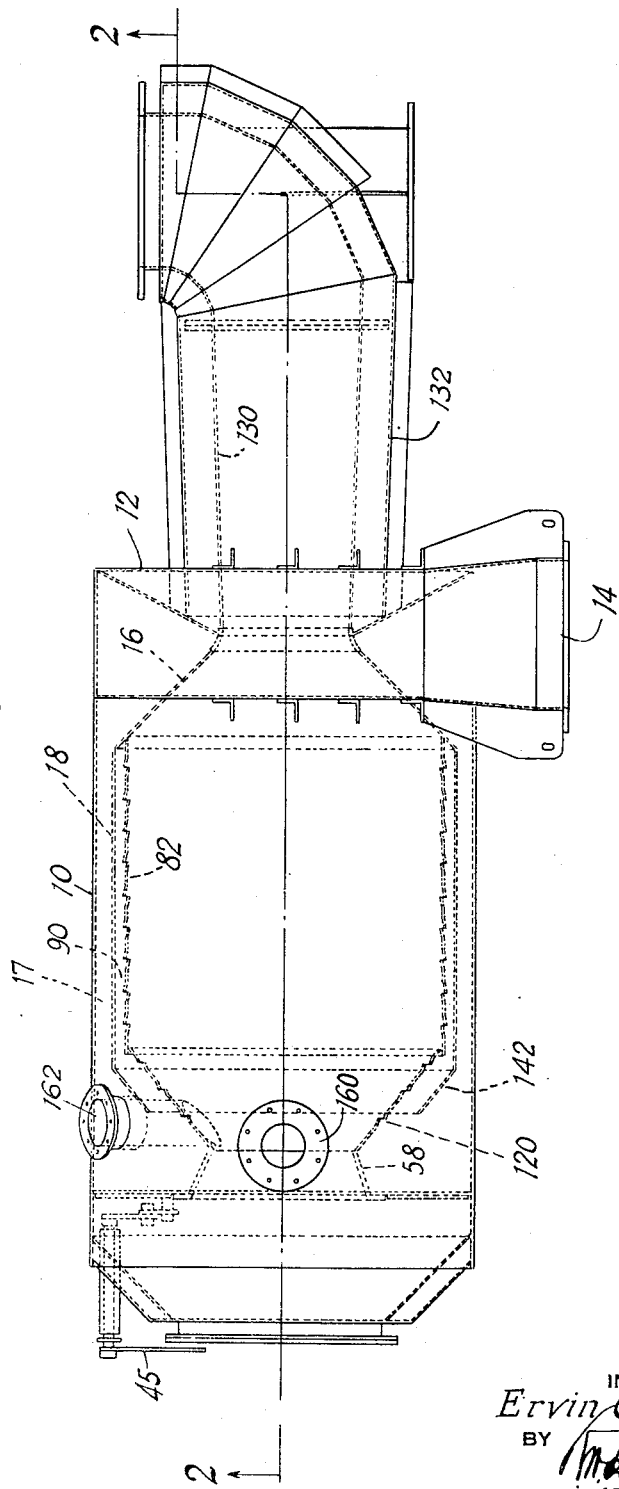
Fig. 1 is a plan of the illustrative combustion chamber.
Figure 2:
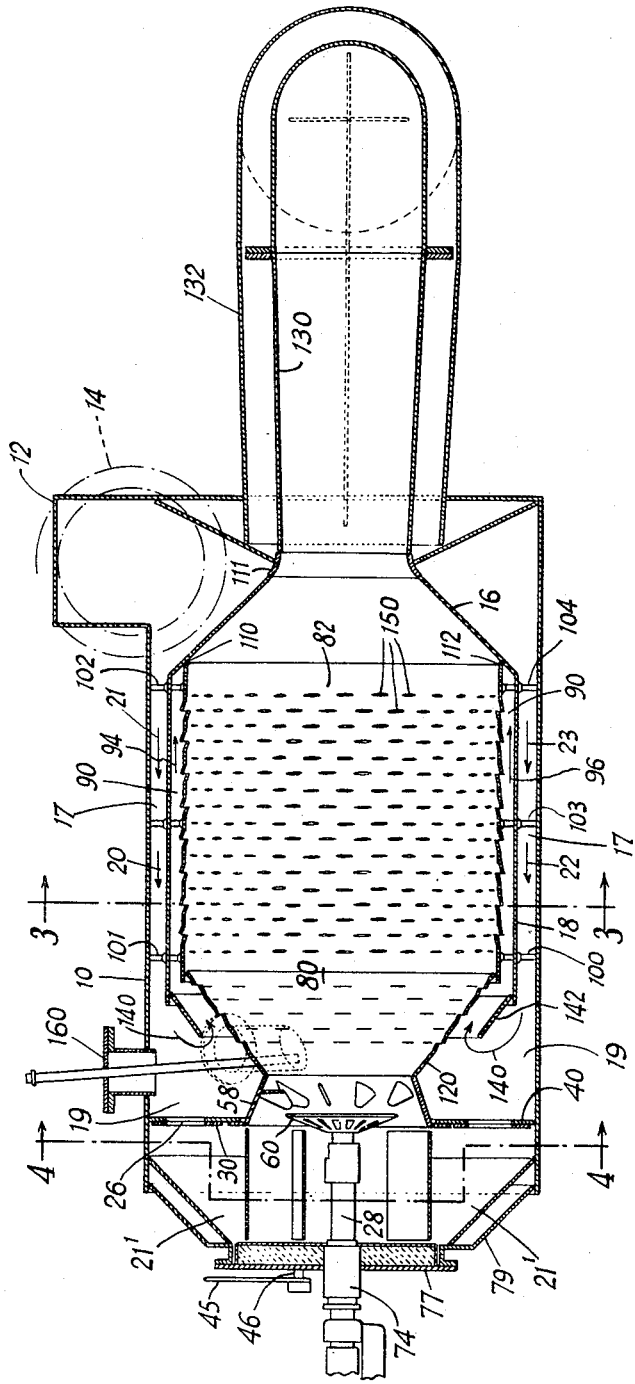
Fig. 2 is a multiple plane vertical section as indicated at 2—2 of Fig. 1.
Figure 4:
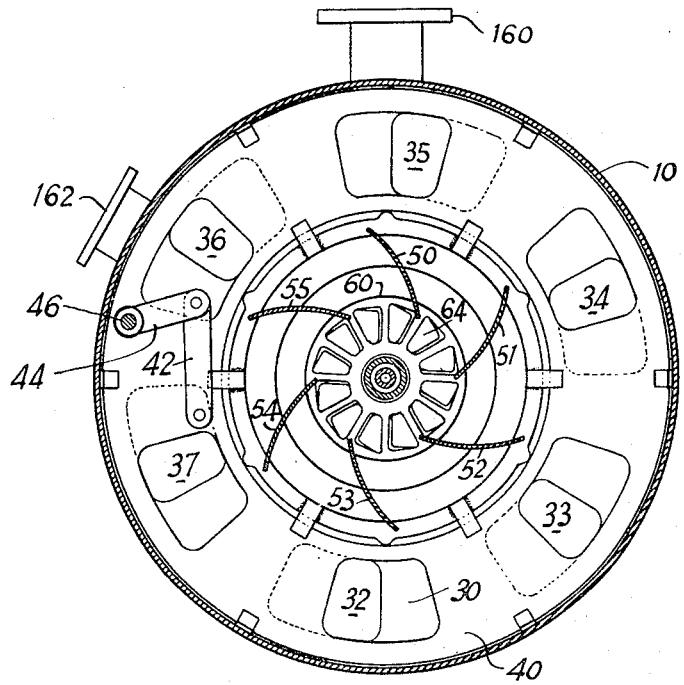
Fig. 4 is a transverse vertical section through the burner on the line 4—4 of Fig. 2.
Figure 3:
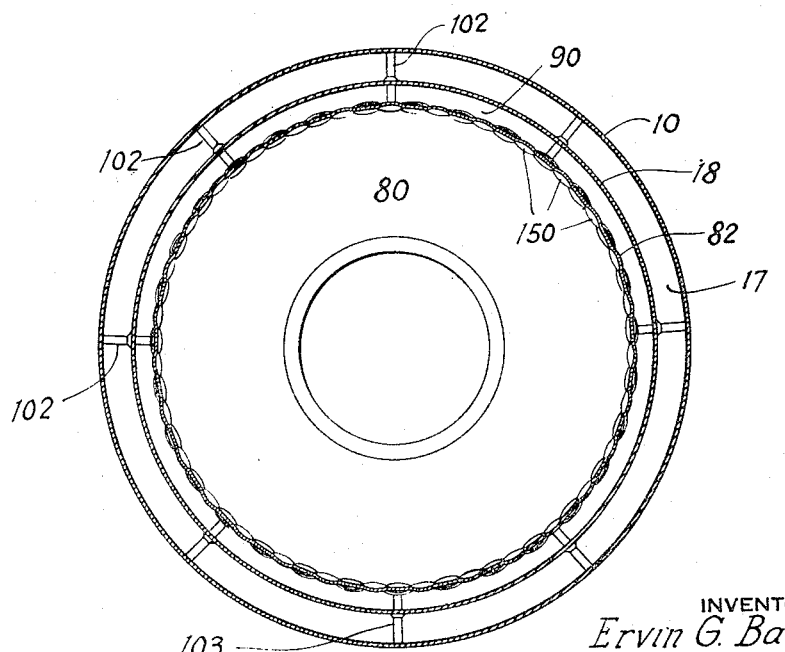
Fig. 3 is a transverse vertical section on the line 3—3 of Fig. 2.
Figure 5:
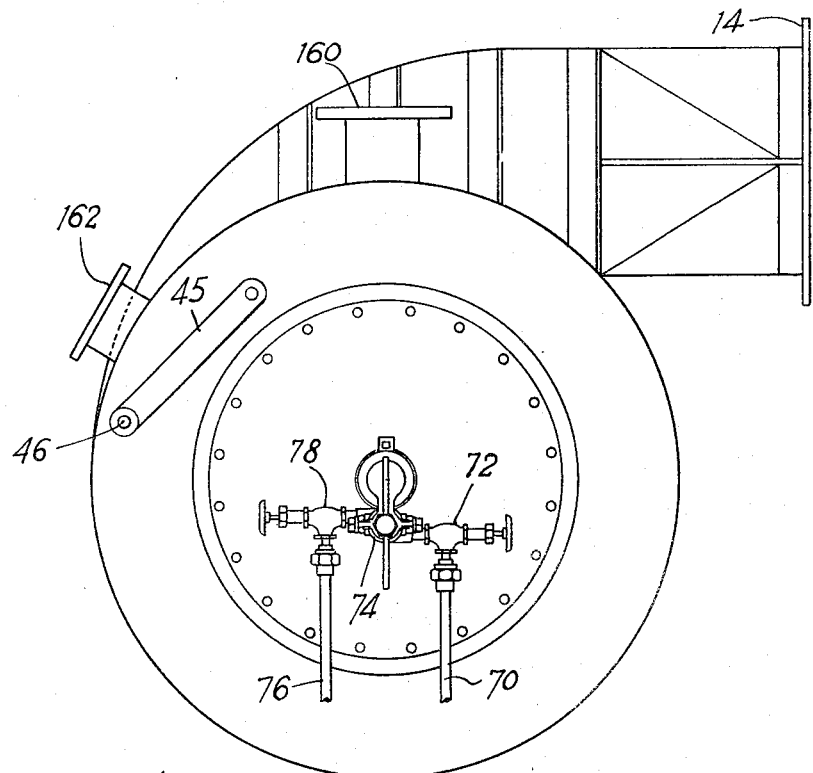
Fig. 5 is an end elevation of the illustrative heater.

As shown in the drawings, the combustion chamber includes an outer metallic cylindrical casing section or shell 10 adapted for withstanding a super-atmospheric internal gaseous pressure which is provided by a blower or compressor (not shown) discharging to the flanged inlet connection 14 of the volute 12. The latter is attached to the end of the outer casing 10, and arranged about the frusto-conical plate member 16. This plate member has its large end joined to the end of a metallic cylindrical partition, or intermediate shell 18, which is spaced inwardly of the outer casing 10 to provide an annular passageway 17 for the flow of air (or other gaseous fluid under pressure) in the direction of arrows 20—23.

At the air outlet end of the annular passageway 17, there is a frusto-conical member 142. This member extends from the end portion of the partition 18 to provide a diverging annular air flow passage to an annular chamber 19. Part of the air from the latter chamber flows through the air register ports 32—37 to an inlet chamber 21' of the fluid fuel burner. These ports are provided in the transverse diaphragm forming the end wall of the chamber 19 facing the outlet end of the diverging passage. The remainder of the air reverses its general direction to flow into the combustion chamber proper as hereinafter described.

The annular chamber 19 has its inner wall formed of two juxtapositioned frusto-conical members 120 and 58, the latter constituting the bladed cone of the atomizing liquid fuel burner 28. The fuel burner shown is of the air atomizing type to which compressed air supplied through a conduit 70 fitted with valve 72, and oil is supplied through conduit 76 provided with valve 78. These conduits lead to the external end fitting 74 of the burner tube 28. This tube extends through the heat insulated removable casing panel 77 disposed transversely of and connected to a double walled frusto-conical member 79 joined with the outer casing 10 to enclose the burner air chamber 21'. The inner end of the burner tube carries an impeller plate 60, and the flow of air to the burner may be controlled by rotating the ported plate 40 with respect to diaphragm 30 by the mechanism consisting of links 42 and 44 and the hand lever 45 connected to the control shaft 46.

Fixed air deflectors 50—55 act to give the air a swirling motion as it passes into the bladed burner cone. With the burner assembly as described, quick mixing of fuel and air is attained to provide good combustion conditions with a minimum excess air requirement.

The inner shell or wall defining the combustion space 80 is formed for a major portion of its length by a cylindrical metallic member 82, which may be of a ferrous alloy of high heat resistance. It is preferably concentric with the cylindrical metallic partition, or intermediate shell 18 to provide a longitudinally extending annular air passage 90 therebetween of substantially uniform radial width.

At the burner end of the combustion chamber, the frusto-conical member 120 extends from the forward end of the burner cone 58 to the end of the inner shell 82. At the outlet end of the combustion space the inner shell or wall member 82 bears on the cone 16 and may be welded thereto by a circumferential weld as indicated at 110 and 112.

The inner and intermediate shells 82 and 18 are supported in radially spaced relationship centrally of the outer casing 10 by spacers 100—104 distributed circumferentially over the shells. These spacers are rigidly attached in heat transfer relationship by welding at their inner ends to the shells or cylinders 82 and 18, respectively, while their outer ends merely have bearing contact with the surrounding shells 18 and 10, thereby providing for relative longitudinal expansion movements of parts 82, 18, and 10, as permitted by their end connections.

The gas outlet of the combustion chamber is disposed axially thereof and centrally of the cone 16, from which a rounded throat 111 merges into a tapered conduit 130 to provide a Venturi type of outlet. As this conduit will be at elevated temperature due to the temperature of gases flowing therethrough, it is shielded by an annularly spaced exterior tubular construction 132 in the present instance.

Air under pressure originating from two distinct sources is introduced to the combustion chamber in three ways. In the first, primary air is introduced with the fuel through the burner 28 as an atomizing medium. Another involves secondary air to support combustion of the fuel. This provides the desired excess over theoretical combustion requirements. It is introduced through the bladed burner throat cone 58. The third involves tertiary air to provide the desired volume and temperature of heated gas. It is introduced through the specially formed openings in the inner shell which forms the metallic wall of the combustion space 80.

The combustion space wall comprising the shell 82 and the frusto-conical section 120 at the burner end of the combustion chamber have specially formed elongated openings 150 which are closely longitudinally spaced and arranged in circumferential rows over the major portion of the inner shell. The openings of adjacent rows are in staggered relationship and are so circumferentially spaced in relation to their circumferential length that longitudinal lines through the ends of successive longitudinally spaced openings cross an intervening opening, as idicated by the line A—A in Fig. 6. The elongated openings, or apertures, are ovate or tapered and the overlapping arrangement of the apertures (in successive circumferential rows) compensates for the reduced flow areas of the small ends of the apertures. This promotes circumferential uniformity of gas flow into the combustion space.

In the chamber, each circumferential row has a large number of openings, as shown in the drawings, and the rows are relatively closely spaced axially, (for example, one and one-half inches apart) to provide several rows (17, for example).

Figures 7, 8, 9:
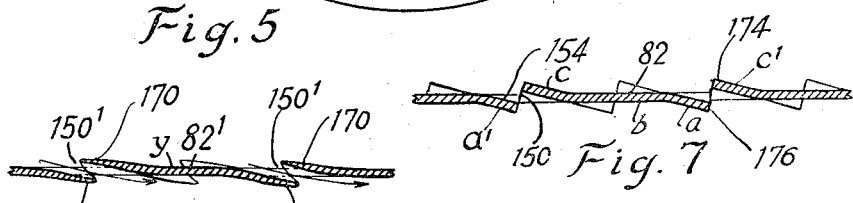
Fig. 7 is a fragmentary section through the combustion chamber wall on the line 7—7 of Fig. 6.
Fig. 8 is another fragmentary section of the combustion chamber wall on the line 8—8 of Fig. 6.
Fig. 9 is a fragmentary section showing a modified wall construction.
Figure 6:
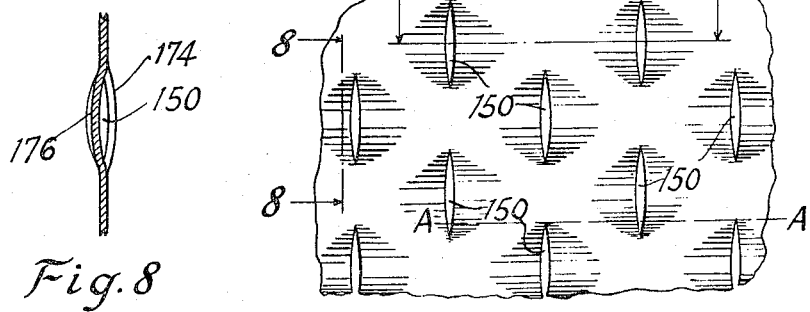
Fig. 6 is a fragmentary plan of the combustion chamber wall.

The frusto-conical section 120 (at the burner end of the combustion chamber) over which the cylindrical section telescopes, has a total of five (5) longitudinally spaced rows of openings with openings of alternate rows arranged in two sets, with three openings in each row of one set and two openings in each row of the other set, the openings in each set being in alignment axially. The row to row spacing in the cone corresponds to row to row spacing in the cylindrical section. The openings 150, as indicated in Figs. 6, 7, and 8, have a circumferential length of one and one-half inches with opposed edges of the opening having opposite cambers or curvatures at radii of $4\frac{7}{16}$ inches cambered $\frac{1}{16}$ inch from the mean diameter of the cylinder wall to provide openings having a maximum width at the center of $\frac{1}{8}$ inch, decreasing toward each end. The camber inwardly of the mean diameter is at the side the burner and the camber outwardly from the mean diameter is at the combustion chamber gas outlet side, so that the elongated openings from the annular air passage 90 face the outlet end of the combustion space 80. This arrangement is utilized in the elongated openings in the conical section, and the cylindrical section 82 to present a cylindrical shell of moving gas (or air and gas) of lower temperature within the combustion space and immediately adjacent inner surface of the shell 82 while at the same time maintaining the minimum pressure drop.

Fig. 9 illustrates a modified detail construction of the elongated openings in which thinned edges or lips 170 and 172 may be provided by peening the plate edges 174 and 176, or by some other suitable method of fabrication. With this modification, eddy currents are minimized and the pressure drop from the annular passage 90 to the combustion space is reduced. This construction also is particularly effective in maintaining the incoming air as a thin shell of lower temperature immediately adjacent the inner surface of the combustion space wall to protect the metal against overheating. The effectiveness of the outside lips 170 as air deflectors or air scoops is also notably increased.

In the Fig. 7 construction the metal of the wall 82 between successive openings 150 has inwardly bent portions such as $a$ and $a'$ coacting with the outwardly pressed or bent portions such as $c$ and $c'$ to form substantially parallel walls for the flow of gas through the openings. Between the bent portions such as $a$ and $c$, there are intermediate portions such as $b$ remaining in alignment with the cylindrical wall. A similar arrangement is presented by the Fig. 9 construction with the outwardly bent portions 170 and the inwardly bent portions 172 forming substantially parallel walls for the openings 150'. Between successive openings in each axial row, there are intermediate portions of the wall 82' which remain in their cylindrical positions. In either of the Figs. 7 and 9 embodiments, the sheet or plate to form the combustion chamber wall is sheared at the positions of the apertures, and the sheared portions such as $a$ and $c$ may be bent as shown in the same operation.

In the modified combustion installation shown in Figs. 10, 11, and 12 of the drawings, the general construction of the three concentric shells 10', 18' and 82' is much the same as that of the corresponding components of the Fig. 1 installation. The operation of the burner and the flow of the gases are also much the same. However, the burner housing, including cone 58', the diaphragm 30', and the annular section 180, the double wall cone 79' and the panel 77' are made so as to be quickly detachable as a unit from the main section of the outer shell 10'. To this end, the main section of 10' has a heavy annular flange 182 fixed thereto at its left hand end. A corresponding flange 184 is fixed to the section 180 of the burner housing. These flanges are secured in operative relationship by bolts 186 passing through the flanges. By this means, the entire burner housing may be quickly detached for the purpose of inspection or repair.

The Fig. 10 embodiment also involves U-shaped spacers 190, preferably welded to the external surfaces of the inner shell 82' at the positions indicated in the drawings. They are disposed in circumferential rows, the spacers in each row straddling a center line of a row of the elongated openings 150'. Their longitudinal axes are also arranged parallel to the longitudinal axis of the inner shell 82'.

The right hand part of the perforated cone 120' of the Fig. 10 embodiment also has externally thereof a supplementary annular plate 192 secured in radially spaced relationship to the cone by the studs 194. Preferably, the inner ends of these studs are welded to the cone 120' and their outer ends extend through openings in the plate 192 and are welded to the latter as indicated at 193 and 195.

The cone 120' and the plate 192 are also provided with circumferential rows of radially disposed lugs 196 and 198 extending outwardly to positions corresponding to radial positions of the shells 18' and 82', respectively.

The intermediate shell or partition 18' is also spaced radially of the outer shell 10' by means of the adjustable spacers 200. These are arranged in circumferential rows about the shell 10' and their construction is indicated in Fig. 12. Each spacer involves a nut 202 fixed to the exterior of the surface of the shell 10' in alignment with an opening therein. The screw-threaded stud or bolt 200 is threaded through a movable nut 204 and then through the fixed nut 202. Subsequently, the turning of the nut 204 relative to the spacer 200 tightens this nut against the fixed nut 202 to lock the spacer in predetermined position.

The combustion installations shown in the drawings are intended to deliver a large volume, of the order of 63,000 lbs. per hour, of hot gases at such a moderately high temperature as 1750° F. This weight of gases is much greater than the weight of the air required to burn the fuel necessary to supply the heat.

It has been found desirable to limit the air introduced through the burner to a total approximately 200% of theoretical requirement in order that efficient smokeless short flame combustion may be maintained, and the manner in which the tertiary air is introduced in heating and mixing relationship to the products of combustion is important in contributing to proper cooling of the combustion chamber wall and the delivery of the hot gases at a uniform predetermined temperature.

The combustion of the fuel with the burner introduction of 200% total air creates a high temperature zone extending axially of the chamber and having its highest temperature a short distance from the burner. Thus, hot products of combustion passing axially of the chamber radiate heat to the surrounding metallic wall raising its temperature to such a degree that its outer face will in turn radiate heat across the annular passage 90 to the metallic partition 18. The heated partition 18 will, in turn, radiate heat to the outer shell or casing 10.

Air delivered to volute 12 or 12' at a super-atmospheric pressure sufficient to overcome flow resistances and deliver hot gases to the Venturi outlet 130 (or 130') at the required pressure, flows through the outer annular passageway 17 as indicated by the arrows 20—23 and in passing through this passage receives heat from the walls of shells 18 and 10, to maintain the metal temperature of same at an operative level and reclaim heat into the secondary and tertiary air. This absorption of heat makes it possible to construct the heater with a minimum of external heat insulating material.

After the heated air flows from the annular chamber 17, the secondary air passes through the oppositely arranged ports 32—37 to the burner without change of direction while the tertiary air is directed in an additional heat absorptive path to effect further furnace wall cooling. The tertiary air, turning with a minimum flow resistance in annular chamber 18 (or 18') as indicated by arrows 140, flows into the final annular flow passage 90 from which it is directed into the combustion space 80 through the spaced openings 150.

The outer sides or lips 174 of openings 150 (and 170 of the openings 150') for the annulus 90 (or 90') face the inlet end of the annular air passage and are in opposition to the general direction of tertiary air flow so that the air is deflected through the openings in a plurality of similar wide flat streams with a minimum of flow resistance. In passing (as indicated by arrows 94 and 96) longitudinally of annular passage 90 which is comparatively narrow to insure high velocity flow, the air is raised still further in temperature by heat transmission from the heated walls 18 and 10.

With the spacing of the elongated openings 150 previously described, the wide flat air streams provide and maintain a longitudinally flowing stratum of air which at the points of introduction is cooler than the metal of wall 82 (or 82') and the central gaseous stream composed of the products of combustion. This stratum of air thus has a still further heat absorptive action in cooling the metal wall and maintaining it at a temperature low enough for long continued operation.

The tertiary air is continually drawn into the central moving stream of products of combustion and is mixed therewith. As a further means to promote mixing and the delivery of a stream of acceptable uniformity of temperature, the Venturi outlet formed by the combination of the smaller end of the frusto-conical member 16 and conduit 130 (or by the sections 16' and 130', Fig. 10) is provided.

The radial width of the annular passage 90 is considerably less than corresponding dimension of the outer passage wall 17 to insure higher air velocity conditions adjacent the combustion space wall 82'.

The flanged nozzle construction indicated at 160 is provided for the reception of a lighter by which the operation of the burner 28 may be initiated and the flanged connection 162 is provided for the installation of a flame detecting device which may employ a photoelectric cell and associated devices for cutting off the fuel supply in the event of flame failure.

What is claimed is:

1. In a combustion chamber installation, a sheet metal cylindrical wall of single sheet thickness construction enclosing a combustion space, a burner injecting burning fuel into the combustion space, a Venturi-like construction forming a gas mixing outlet, and means maintaining a moving envelope of cooling gas externally of said wall, said wall being formed over its entire operating area with a multiplicity of closely spaced wall openings with inner and outer gas deflecting wall parts associated with each opening, the inner deflecting parts being offset inwardly of said wall and extending downstream beyond their associated openings and thereby maintaining an inner envelope of cooling gas along the inner surface of the wall.

2. In a combustion chamber installation for supplying gases at superatmospheric pressures and temperatures above 500° F., a thin metallic combustion chamber wall of a single unitary stratum from end to end and formed as a hollow cylinder to circumscribe a combustion space, a fuel burned ejecting burning fuel into the combustion space from one end of the circumscribing wall construction, means supplying combustion supporting air with the burner for movement along with the burning fuel axially and longitudinally of the wall construction, means maintaining a stratum of cooling gas externally of said wall, said last named stratum enveloping the wall and moving in the same direction as the burning fuel, means causing part of said envelope of cooling gas to be deflected to a position along the inner surface of the wall where it constitutes a substantially complete inner stratum of cooling gas interposed between said burning fuel and the wall, said last named means comprising internal and external wall projections associated with wall openings and extending thereover from their opposite sides, and a gas mixing outlet construction operative upon the gas of said envelopes and the combustion gases to supply the mixed gases at a uniform temperature and superatmospheric pressure.

3. In a combustion chamber, a single thickness unitary sheet metal cylindrical wall for the combustion chamber, fuel burning means supplying combustion products moving axially through the combustion chamber, means maintaining a thin stratum of cooling gas closely enveloping the wall externally and moving axially thereof in the same direction as said combustion products, the cylindrical wall being formed with a multiplicity of circumferentially extended slit-like openings closely distributed over its entire operative area with two gas deflectors for each opening, the deflectors of each opening being formed integrally from the wall metal and extending axially beyond the opening from opposite sides thereof with one of the deflectors also projecting radially outwardly of the wall and the other projecting radially inwardly of the wall, each opening combining with its gas deflectors to form a gas passage extending axially of the wall and forming therewith a gas passage directing a wide and thin gas stream from said stratum through the wall and along its inner surface in the same direction as said combustion products, said pairs of deflectors with their intervening openings being arranged in closely spaced circular rows around the wall with the passages disposed in staggered arrangement in the successive rows, and a gas mixing Venturi outlet construction for the combustion chamber.

4. In a combustion chamber, an outer wall construction, a sheet metal cylindrical inner wall for the combustion chamber, means supplying moving combustion products to the combustion chamber, said inner wall being spaced radially inwardly of the outer wall, means maintaining a thin stratum of moving cooling gas between said walls and externally enveloping the inner wall and moving axially thereof in the same direction as said combustion products, the cylindrical wall being formed with a multiplicity of circumferentially extended slit-like and end tapered openings closely distributed over its entire operative area, each opening being formed with circumferentially extending and converging margins or edges formed by parts of the wall and providing for a wide and thin gas stream from said stratum through the wall and along its inner surface in the same direction as said combustion products, said openings being arranged in closely spaced circular rows around the wall with a multiplicity of the openings in each row.

5. In a combustion chamber, an outer wall construction, a single thickness sheet metal cylindrical inner wall for the combustion chamber, means supplying moving combustion products to the combustion chamber, said inner wall being spaced radially inwardly of the outer wall, means maintaining a thin stratum of moving cooling gas between said walls and externally enveloping the inner wall and moving axially thereof in the same direction as said combustion products, the cylindrical wall being formed with a multiplicity of circumferentially extended slit-like openings closely distributed over its entire operative area, each opening being formed with circumferentially extending and converging curved margins or edges formed by parts of the wall and providing for a wide and thin gas stream moving from said stratum through the wall and along its inner surface in the same direction as said combustion products, said openings being arranged in closely spaced circular rows around the wall with a multiplicity of the closely spaced openings in each row and with the openings in successive rows disposed in staggered and overlapping arrangement.

6. A combustion chamber for producing a hot mixture of products of combustion and air comprising a casing; a hollow structure, providing a combustion space, disposed within said casing having a closure and an inlet for air at its forward end and an outlet at its rear end, said structure having a wall portion converging from said inlet toward said outlet providing a contracted throat and another wall portion extending rearwardly therebeyond to said outlet, said wall portions providing with said casing, a space forming a passage having an inlet for air at its forward end and an outlet at its rear end, said wall portions at their juncture having port means providing another outlet for said passage, both said passage outlets communicating with said combustion space; and a fuel burner having an outlet in front of and facing said throat.

7. A combustion chamber for producing a hot mixture of products of combustion and air comprising a casing with outer and intermediate spaced shells and an interposed air outer annular passage; a hollow structure, providing a combustion space, disposed within said casing having a closure and an inlet for air at its forward end and an outlet at its rear end, said structure having a first wall portion converging from said inlet toward said outlet providing a contracted throat and a second wall portion extending rearwardly therebeyond to said outlet, said wall portions providing with said casing and intermediate shell a space forming the inner annular passage having an inlet for air at its forward end and an outlet at its rear end, said wall portions at their juncture having port means providing another outlet for said passage, both said passage outlets communicating with said combustion space; and a fuel burner having an outlet in front of and facing said throat, said first wall portion also providing a tapering rear passage diverging rearwardly from the throat and the second wall portion forming a unitary metallic shell extending throughout at least the greater part of the length of the combustion space; said first wall portion also having spaced and distributed metallic formations disposed in the zone of the rear passage for providing extended contact between the air and metal of the wall for maintaining the metal temperature within allowable limits.

8. A combustion chamber for producing a hot mixture of products of combustion and air comprising a casing; a hollow structure, providing a combustion space and a surrounding inner annular air passage disposed within said casing having a closure and an inlet for air at its forward end and an outlet at its rear end, said structure having a front wall portion converging from said inlet toward said outlet providing a contracted throat and another wall portion extending rearwardly therebeyond to said outlet, said hollow structure including an intermediate shell combining with the casing to form an outer annular air passage with an initial air inlet at its rearward portion and an air outlet in communication with the first mentioned air inlet, said wall portions providing with said intermediate shell a space forming the annular inner passage having an inlet for air at its forward end and an outlet at its rear end, said wall portions at their juncture having port means providing another outlet for said inner passage, both said passage outlets communicating with said combustion space; and a fuel burner having an outlet in front of and facing said throat, said structure also providing a tapering rear passage diverging rearwardly from the throat, secondary air for the burner and tertiary air for the combustion space being supplied through said initial air inlet.

ERVIN G. BAILEY.

REFERENCES CITED

The following references are of record in the file of this patent:

UNITED STATES PATENTS

| Number | Name | Date |
|---|---|---|
| 1,655,569 | Scheu | Jan. 10, 1928 |
| 2,029,548 | Summerhays | Feb. 4, 1936 |
| 2,077,043 | Gehnrich | Apr. 13, 1937 |
| 2,097,255 | Saha | Oct. 26, 1937 |
| 2,164,954 | Stephens | July 4, 1939 |
| 2,227,666 | Noack | Jan. 7, 1941 |
| 2,268,464 | Seippel | Dec. 30, 1941 |
| 2,284,157 | Leonard | May 26, 1942 |
| 2,340,120 | Grapp | Jan. 25, 1944 |